United States Patent
Hoffen

(10) Patent No.: US 11,687,663 B2
(45) Date of Patent: *Jun. 27, 2023

(54) METHOD AND SYSTEM FOR AGGREGATING USERS' CONSENT

(71) Applicant: OTONOMO TECHNOLOGIES LTD., Even Yehuda (IL)

(72) Inventor: Itai Hoffen, Oranit (IL)

(73) Assignee: OTONOMO TECHNOLOGIES LTD., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/178,256

(22) Filed: Feb. 18, 2021

(65) Prior Publication Data
US 2021/0173954 A1 Jun. 10, 2021

Related U.S. Application Data

(63) Continuation of application No. 16/429,107, filed on Jun. 3, 2019.

(51) Int. Cl.
*G06F 21/62* (2013.01)
*H04L 9/40* (2022.01)

(52) U.S. Cl.
CPC ...... *G06F 21/6218* (2013.01); *H04L 63/0853* (2013.01)

(58) Field of Classification Search
CPC .......................... G06F 21/6218; H04L 63/0853
(Continued)

(56) References Cited

U.S. PATENT DOCUMENTS 9,210,178 B1 * 12/2015 Roth .................. H04L 63/105
10,075,451 B1 * 9/2018 Hall .................. H04W 12/02
(Continued)

FOREIGN PATENT DOCUMENTS

CN 106506682 3/2017
JP 2001344451 A 12/2001
(Continued)

OTHER PUBLICATIONS

Clinton Karr, "Otonomo Announces the Consent Management Hub", https://www.businesswire.com/news/home/20180522006458/en/Otonomo-Announces-The-Consent-Management-Hub, Published on May 22, 2018, two pages. (Year: 2018).*
(Continued)

*Primary Examiner* — Luu T Pham
*Assistant Examiner* — Walter J Malinowski
(74) *Attorney, Agent, or Firm* — Pearl Cohen Zedek Latzer Baratz LLP

(57) ABSTRACT

A method and a system for aggregating users' consents for use of automotive data by data services are provided herein. The method may include the following steps: obtaining, from a plurality of data sources, a plurality of automotive data records associated with connected vehicles having respective users; determining for each request for automotive data made by said data services, which of the data records require consent; aggregating consent data for each data records, responsive to an indication that the respective user have been authenticated by the data sources; and providing the data services with access to automotive data based on the aggregated consent data. The system may implement the aforementioned steps in a form of a server on a computer network.

15 Claims, 3 Drawing Sheets

(58) Field of Classification Search
USPC .......................................................... 726/28
See application file for complete search history.

(56) References Cited

U.S. PATENT DOCUMENTS

| | | | | |
|---|---|---|---|---|
| 10,469,330 | B1* | 11/2019 | Roth | H04L 41/22 |
| 10,733,685 | B1* | 8/2020 | Gailloux | G06Q 50/265 |
| 10,887,301 | B1* | 1/2021 | Vera | H04L 9/0643 |
| 2002/0016655 | A1* | 2/2002 | Joao | G07C 5/085 |
| | | | | 701/33.4 |
| 2002/0040401 | A1* | 4/2002 | Yasushi | H04L 63/101 |
| | | | | 709/229 |
| 2003/0154406 | A1* | 8/2003 | Honarvar | G06Q 20/4014 |
| | | | | 726/10 |
| 2003/0200172 | A1* | 10/2003 | Randle | G06Q 20/04 |
| | | | | 705/39 |
| 2006/0154642 | A1* | 7/2006 | Scannell, Jr. | G08B 7/066 |
| | | | | 455/404.1 |
| 2008/0103789 | A1* | 5/2008 | Paila | G06Q 10/10 |
| | | | | 705/342 |
| 2010/0100952 | A1* | 4/2010 | Sample | H04L 67/22 |
| | | | | 726/9 |
| 2010/0274815 | A1 | 10/2010 | Vanasco | |
| 2011/0246273 | A1* | 10/2011 | Yarvis | G06Q 30/0615 |
| | | | | 713/168 |
| 2013/0054968 | A1* | 2/2013 | Gupta | H04L 63/08 |
| | | | | 713/168 |
| 2013/0152154 | A1* | 6/2013 | Xiao | G06F 17/00 |
| | | | | 726/1 |
| 2014/0351368 | A1* | 11/2014 | Dudziak | H04W 12/068 |
| | | | | 709/217 |
| 2015/0088335 | A1* | 3/2015 | Lambert | H04L 67/10 |
| | | | | 701/1 |
| 2015/0149765 | A1* | 5/2015 | Pauliac | H04W 12/033 |
| | | | | 713/153 |
| 2015/0199685 | A1* | 7/2015 | Betancourt | G06K 7/10386 |
| | | | | 705/44 |
| 2016/0112208 | A1* | 4/2016 | Williams | H04L 9/3247 |
| | | | | 713/158 |
| 2017/0132431 | A1* | 5/2017 | Gonzalez Blanco | |
| | | | | H04L 63/0838 |
| 2017/0199989 | A1* | 7/2017 | Lilko | G06F 21/10 |
| 2017/0352245 | A1* | 12/2017 | Maher | G08B 21/182 |
| 2017/0358204 | A1* | 12/2017 | Modica | G07C 5/0841 |
| 2018/0039501 | A1 | 2/2018 | Jain et al. | |
| 2018/0260579 | A1* | 9/2018 | Bose | G06F 21/6218 |
| 2019/0005210 | A1* | 1/2019 | Wiederspohn | G06Q 10/10 |
| 2019/0026690 | A1* | 1/2019 | Wappler | G06Q 50/04 |
| 2019/0188934 | A1 | 6/2019 | Calvert | |
| 2019/0228383 | A1* | 7/2019 | Abler | G07C 5/008 |
| 2019/0260580 | A1* | 8/2019 | Chu | H04W 12/041 |
| 2019/0286828 | A1 | 9/2019 | Anderson et al. | |
| 2019/0306128 | A1* | 10/2019 | Kothavale | H04L 9/0637 |
| 2019/0325151 | A1* | 10/2019 | Garon | G06F 21/54 |
| 2019/0392162 | A1* | 12/2019 | Stern | G06F 21/6218 |
| 2020/0034909 | A1* | 1/2020 | Noplos | G06Q 20/10 |
| 2020/0106750 | A1 | 4/2020 | Baker | |
| 2020/0137572 | A1* | 4/2020 | Lee | H04L 63/0861 |
| 2020/0153835 | A1* | 5/2020 | Jacobs | H04L 63/102 |
| 2020/0177597 | A1* | 6/2020 | Kabesa | H04L 63/0876 |
| 2020/0210896 | A1* | 7/2020 | Itzkovich | G06F 21/6254 |
| 2020/0265655 | A1* | 8/2020 | Ha | G06Q 50/30 |
| 2021/0256159 | A1* | 8/2021 | Ninglekhu | H04W 4/70 |
| 2022/0198057 | A1* | 6/2022 | Johnston | G06F 21/6245 |

FOREIGN PATENT DOCUMENTS

| | | | | |
|---|---|---|---|---|
| KR | 20180130250 | | 12/2018 | |
| KR | 20190018133 | | 2/2019 | |
| KR | 20200048298 | A * | 5/2020 | H04W 12/084 |
| KR | 20200099906 | A * | 8/2020 | G06Q 30/0645 |
| WO | WO 2017/149451 | | 9/2017 | |
| WO | WO-2020223263 | A1 * | 11/2020 | G06F 21/6245 |

OTHER PUBLICATIONS

Amit Karp and Adam Fisher, "Connected Cars: A Multibillion-Dollar Opportunity", https: /www.bvp.com/atlas/connected-cars-a-multibillion-dollar-opportunity, Nov. 2, 2016, four pages. (Year: 2016).*
"Otonomo company introduces data management center for intelligent connected cars", https:/ /www.sohu.com/a/232822646_180520, May 25, 2018, two pages. (Year: 2018).*
Maneesh Prasad, editor. Smart Automotive, Sep.-Oct. 2018, 44 pages. (Year: 2018).*
Diethe. "Releasing ehealth analytics into the wild: lessons learnt from the sphere project." In Proceedings of the 24th ACM SIGKDD International Conference on Knowledge Discovery & Data Mining, pp. 243-252. 2018. (Year: 2018).*
Shimomura, Michio, Akihisa Kodate, Misako Miura, Mami Muramatsu, Motoko Suzuki, Ryota Seki, and Tomohiro Honma. "A proposal of life-log aggregation system using smart TV as management hub." In 2014 IEEE 3rd Global Conference on Consumer Electronics (GCCE), pp. 262-263. IEEE, 2014. (Year: 2014).*
Brenner, Eugen, and Ivo Derado. "Uml extension for asam-gdi device capability description." In International Conference on the Unified Modeling Language, pp. 148-161. Springer, Berlin, Heidelberg, 2000. (Year: 2000).*
Singh, Satnam, Steven W. Holland, and Pulak Bandyopadhyay. "Trends in the development of system-level fault dependency matrices." In 2010 IEEE Aerospace Conference, pp. 1-9. IEEE, 2010. (Year: 2010).*
Chadwick, David W., and George Inman. "Attribute aggregation in federated identity management." Computer 42, No. 5 (2009): 33-40. (Year: 2009).*
Su, Xiang, Jarkko Hyysalo, Mika Rautiainen, Jukka Riekki, Jaakko Sauvola, Altti Ilari Maarala, Harri Hirvonsalo, Pingjiang Li, and Harri Honko. "Privacy as a service: Protecting the individual in healthcare data processing." Computer 49, No. 11 (2016): 49-59. (Year: 2016).*
Office action for U.S. Appl. No. 16/429,107, dated Aug. 18, 2021.
Office action for U.S. Appl. No. 16/429,107, dated Apr. 26, 2022.
Esposito, Christian and Mario Ciampi; "On security in publish/subscribe services: A survey." IEEE Communications Surveys & Tutorials 17, No. 2 (2014) 966-997. (Year: 2014).
Office action for U.S. Appl. No. 16/429,107 dated Nov. 9, 2022.
Rech et al. "A Novel Embedded Platform for Secure and Privacy-Concerned Cross-Domain Service Access", in 2019 IEEE Intelligent Vehicles Symposium (IV), pp. 1961-1967, IEEE 2019.

* cited by examiner

METHOD AND SYSTEM FOR AGGREGATING USERS' CONSENT

CROSS REFERENCE TO RELATED APPLICATIONS

This application is a continuation of U.S. patent application Ser. No. 16/429,107, filed on Jun. 3, 2019 which is incorporated herein by reference in its entirety.

FIELD OF THE INVENTION

The present invention relates generally to the field of processing data features, and more particularly to processing automotive data records obtained from connected vehicles.

BACKGROUND OF THE INVENTION

Prior to the background of the invention being set forth, it may be helpful to provide definitions of certain terms that will be used hereinafter.

The term "connected vehicle" as used herein is defined as a car or any other motor vehicle such as a drone or an aerial vehicle that is equipped with any form of wireless network connectivity enabling it to provide and collect data from the wireless network. The data originated from and related to connected vehicles and their parts is referred herein collectively as "automotive data".

The term "data marketplace" or "data market" as used herein is defined as an online platform that enables a plurality of subscribers (e.g. applications, users) to access and consume data. Data marketplaces typically offer various types of data for different markets and from different sources. Common types of data consumers include business intelligence, financial institutions, demographics, research and market data. Data types can be mixed and structured in a variety of ways. Data providers may offer data in specific formats for individual clients.

Data consumed in these marketplaces may be used by businesses of all kinds, fleets, business and safety applications and many types of analysts. Data marketplaces have proliferated with the growth of big data, as the amount of data collected by municipalities and smart cities, businesses, websites and services has increased, and all that data has become increasingly recognized as an asset.

The term "privacy regulations" as used herein is defined as regulations aimed primarily to give control to individuals over their personal data. Exemplary privacy regulations include the General Data Protection Regulation (GDPR) of the European Union (EU) and the California Consumer Privacy Act (CCPA). Similar privacy regulations are in force or being contemplated in other jurisdictions.

Controllers of personal data must put in place appropriate technical and organizational measures to implement the data protection principles. Business processes that handle personal data must be designed and built with consideration of the principles and provide safeguards to protect data and use the highest-possible privacy settings by default, so that the data is not available publicly without explicit, informed consent, and cannot be used to identify a subject without additional information stored separately.

A processor of personal data must clearly disclose any data collection, declare the lawful basis and purpose for data processing, and state how long data is being retained and if it is being shared with any third parties. Data subjects have the right to request a portable copy of the data collected by a processor in a common format and the right to have their data erased under certain circumstances, a concept also known as the right to be forgotten.

The term "data anonymization" as used herein is defined as a type of information sanitization whose intent is privacy protection. It is the process of either encrypting or removing personally identifiable information from data sets, so that the people and other entities whom the data describe remain anonymous.

In accordance with the prior art, in cases where automotive data from data sources is being sent directly to third party applications, the consent of automotive data owners (e.g., drivers) is managed at the data sources themselves. In any case that a third-party application requests access to specific data of a specific user, the data source first needs to seek consent from the user or check whether consent has been already given by the user. The user identification and consent can be carried out using existing protocols such as "oAuth" and "openID Connect".

The introduction of automotive data marketplaces complicates the management of users consent, and there is a need to effectively monitor and manage the consent given by data owners (users) for various third-party services (applications) that request access to automotive data originated by automotive data sources but managed and stored by the marketplace.

SUMMARY OF THE INVENTION

According to some embodiments of the present invention, a method and a system for aggregating users' consents for use of automotive data by data services are provided herein. The method may include the following steps: obtaining, from a plurality of data sources, a plurality of automotive data records associated with connected vehicles having respective users; determining for each request for automotive data made by said data services, which of the data records require consent; aggregating consent data for each data records, responsive to an indication that the respective user have been authenticated by the data sources; and providing the data services with access to automotive data based on the aggregated consent data. The system may implement the aforementioned steps in a form of a server on a computer network.

These additional, and/or other aspects and/or advantages of the present invention are set forth in the detailed description which follows.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
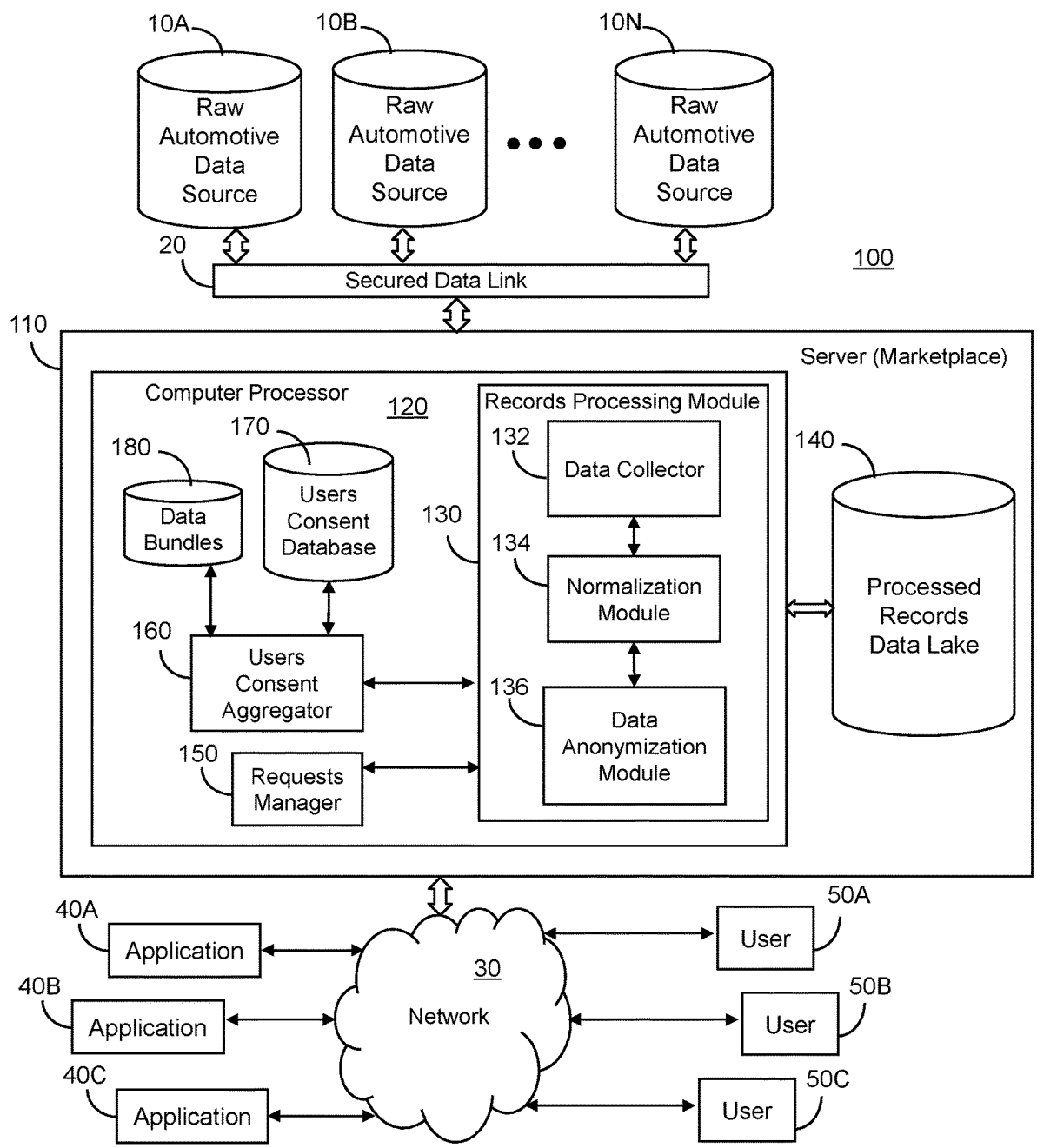
FIG. 1 is a block diagram illustrating non-limiting exemplary architecture of a marketplace server for aggregating automotive data as well as users consent for a regulated consumption of the automotive data, in accordance with embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that, throughout the specification, discussions utilizing terms such as "processing," "computing," "calculating," "determining," or the like refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating non-limiting exemplary architecture 100 of a marketplace server for aggregating automotive data as well as users' consent for a regulated consumption of the automotive data, in accordance with embodiments of the present invention.

The system may include: a server 120 configured to obtain a plurality of automotive data relating to connected vehicles originated from a plurality of data sources 110. System 100 may include a server 110 implementing the data marketplace and connected via network 30 to a plurality of users 50A-50C (e.g., drivers who are the data owners). Vehicle related data, possibly obtained from various sensors on the connected vehicles of users 50A-50C, may be stored in raw format on a plurality of raw automotive data sources 10A-10N and may be accessed by server 110 via a secured data link 20. Server 110 may include a records processing module 130 implemented by a computer readable code running on computer processor 120. Records processing module 130 may include a data collector 132, a normalization module 134 and a data anonymization module that are configured to collect, normalize and anonymize respectively the data arriving from the plurality of automotive data sources 10A-10N, thus creating a processed records data lake 160 storing vehicle related data. The processed automotive data records are being consumed and used by various data consumers such as applications 40A-40C connected to server 110 via network 30, responsive to various requests for services made by plurality of users 50A-50C. These request may be made directly by users 50A-50C to applications 40A-40C over network 30.

In accordance with some embodiments of the present invention, applications 40A-40C may approach server 110 with data requests based upon the requests for services made by users 50A-50C. Server 110 may include a requests manager 150 which may be configured to process requests for data only after verifying user consent for the requested data.

In accordance with some embodiments of the present invention, when applications 40A-40C request data for a certain service (e.g., parking application, insurance application), it is usually unknown to them, which specific sensors and which data sources are needed in order to implement that service. Therefore, the specific users' consent associated with that data is also unknown to the applications.

In order to effectively manage the consent of users 50A-50C, server 110 may further include a users consent aggregator 160 implemented by a computer code over computer processor 120. Users' consent aggregator 160 may be configured to respond to requests for data made to requests manager 150 by indicating first which data records are needed for the requested service. This may be done by data bundles 180 which associate specific services (e.g., use cases of data consumption) and specific data records (e.g., type of data records and source of data records). Once the requested data has been identified, server 110 may enable an authentication session between the relevant user (e.g., user 50B) and the respective automotive data source (e.g., data source 10B). The authentication session may be carried out by known protocols such as OpenID Connect and oAuth. Once authentication has been successful and consent for the relevant data records (e.g., a bundle of data records suitable for the requested service), automotive data source (e.g., data source 10B) provides server 110 with respective access token which may be stored on users' consent database 170 and may be managed and monitored by users' consent aggregator 160.

For each requested data, the process of authentication by one or more of the automotive data sources 10A-10N is repeated, the access tokens or similar user consent data is being aggregated and stored on users' consent database 170 so server 110 eventually holds both aggregated data in the form of processed records data lake 140 and the respective consent data on users' consent database 170 to accompany it.

In accordance with some embodiments of the present invention, user consent data may be in a form of various tables stored on users' consent database 170 mapping data records with respective consent. A consent can be made for the entire duration of the service subscription made between users 50A-50C and respective applications 40A-40C.

Figure 2:
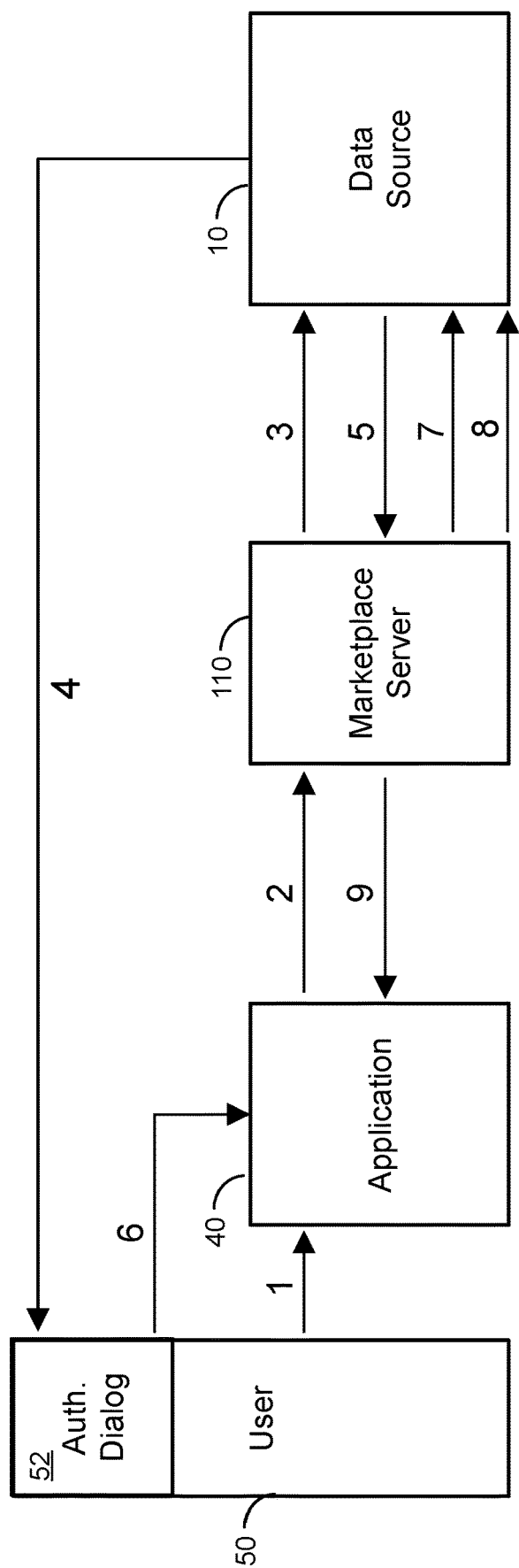
FIG. 2 is a process diagram illustrating non-limiting exemplary flow of managing the aggregated users consent, in accordance with embodiments of the present invention.

FIG. 2 is a process diagram illustrating non-limiting exemplary flow of managing the aggregated users' consent, in accordance with some embodiments of the present invention. In step 1, user 50 (data owner) connects, possibly via a browser, to application 40 (data consumer) and requests to login with authorized data source 10. In step 2, application 40 forwards user authorization request to marketplace server 110. In step 3, marketplace server 110 forwards user authorization request to authorized data source 10. In step 4, the authorized data source 10 authenticate user 60. In step 5, the authorized data source 10 sends marketplace server 110 an authorization code/token. In step 6, user 50 is redirected back to application 40 over authentication dialog 52. In step 7, marketplace server 110 requests user data from data source 10 for which consent has been given. In step 8, data source 10 provides marketplace server 110 with the requested user data. In step 9, the user data is provided from marketplace server 110 to application 40.

It is understood that, when marketplace server 110 acts as user data aggregator, all data from the various data sources is already aggregated, possibly in the form of processed data records on a data lake, and steps 7 and 8 are carried out within marketplace server 110.

Figure 3:
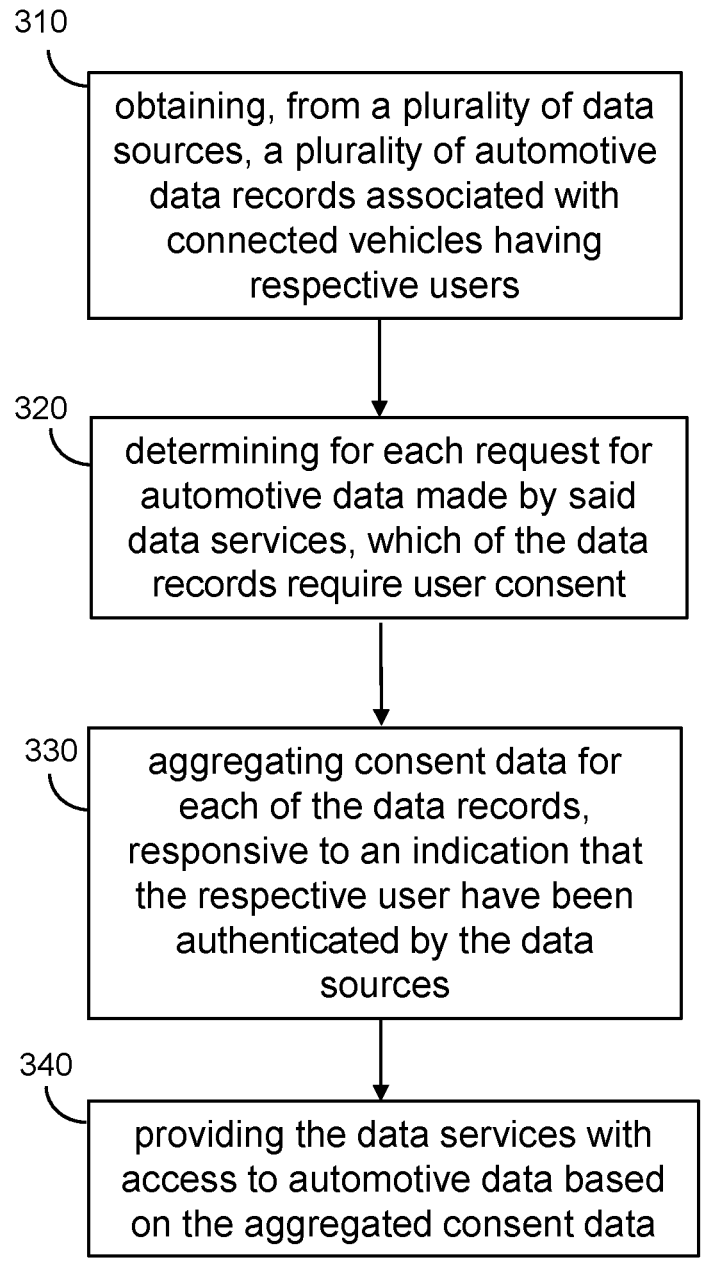
FIG. 3 is a high-level flowchart illustrating non-limiting exemplary method in accordance with embodiments of the present invention.

FIG. 3 is a high-level flowchart illustrating non-limiting exemplary method in accordance with some embodiments of the present invention. Method 300 may include the following steps: obtaining, from a plurality of data sources, a plurality of automotive data records associated with connected vehicles having respective users 310; determining, for each request for automotive data made by said data services, which of the data records require consent 320; aggregating consent data for each data record, responsive to an indication that the respective user have been authenticated by the data sources 330; and providing the data services with access to automotive data based on the aggregated consent data 340.

In accordance with some embodiments of the present invention, the indication that the respective user has been authenticated by the data source is achieved by establishing an authentication session between one of the users and a respective data source.

In accordance with some embodiments of the present invention, the determining for each request for automotive data made by said data services, which of the data records require consent is carried out using data bundles associating data consumption use cases and respective data records and data sources.

In accordance with some embodiments of the present invention, the automotive data records are normalized, anonymized and stored on a data lake.

In accordance with some embodiments of the present invention, the aggregating consent data indicates for which of the obtained automotive data records a respective user consent has been given, and for each of the data services.

In accordance with some embodiments of the present invention, the aggregating consent data comprises a plurality of access tokens provided by the data sources and authorizing access to data for which respective users have been authenticated.

It should be noted that method 300, according to some embodiments of the present invention, may be stored as instructions in a computer readable medium to cause processors, such as central processing units (CPU) to perform the method. Additionally, the method described in the present disclosure can be stored as instructions in a non-transitory computer readable medium, such as storage devices which may include hard disk drives, solid state drives, flash memories, and the like. Additionally, non-transitory computer readable medium can be memory units.

In order to implement the method according to some embodiments of the present invention, a computer processor may receive instructions and data from a read-only memory or a random-access memory or both. At least one of the aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not be construed that there is only one of that element.

It is to be understood that, where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of aggregating users' consents for use of automotive data by data services, the method comprising:
obtaining, from a plurality of data sources, a plurality of automotive data records associated with connected vehicles having respective users, wherein the obtaining comprises: collecting raw data from sensors on the connected vehicles of users, normalizing and anonymizing the raw data to create the automotive data records, and storing the automotive data records on a data lake;

issuing requests for automotive data by at least one of said data services, wherein it is unknown to the at least one of said data services which data source and which users' consent associated therewith are needed in order to address the requests by the at least one of data services;

determining, for each one of the requests for automotive data made by said data services, which of the data records require user consent;

aggregating consent data for each data records, responsive to an indication that the respective user has been authenticated by the data sources; and providing the data services with access to automotive data based on the aggregated users consent data, wherein upon at least one of said respective users connecting to at least one of said data services and issuing a request to login with at least one of said data sources:

forwarding said request to a server which forwards said request to the at least one of the data sources, wherein upon authenticating the at least one of said respective users by the at least one of the data sources:

sending, by the at least one of the data sources, to said server, an authorization code/token;

redirecting the at least one of said respective users to the at least one of said data services via an authentication dialog enabled by said code/token; and forwarding by the server, the automotive data from the at least one of the data sources for which consent has been given to the at least one of said data services, wherein said indication that the respective user has been authenticated by the data source is achieved by establishing an authentication session between one of the users and a respective data source.

2. The method according to claim 1, wherein said determining for each request for automotive data made by said data services, which of the data records require consent is carried out using data bundles associating data consumption use cases and respective data records and data sources.

3. The method according to claim 1, wherein said automotive data records are normalized and anonymized.

4. The method according to claim 1, wherein the aggregating consent data indicates for which of the obtained automotive data records, a respective user consent has been given, and for each of the data services.

5. The method according to claim 1, wherein the aggregating consent data comprises a plurality of access tokens provided by the data sources and authorizing access to data for which respective users have been authenticated.

6. A server for aggregating users' consents for use of automotive data by data services, the server comprising:
a computer processor; and
a memory storing computer executable instructions that, when executed by the computer processor, cause the computer processor to implement:
a records processing module configured to obtain, from a plurality of data sources, a plurality of automotive data records associated with connected vehicles having respective users, by: collecting raw data from sensors on the connected vehicles of users, normalizing and anonymizing the raw data to create the automotive data records, and storing the automotive data records on a data lake;

a plurality of data services configured to issue requests for automotive data, wherein it is unknown to the at least one of the plurality of data services, which data source and which users' consent associated therewith are needed in order to address the requests by the at least one of the plurality of data services;

a requests manager configured to determine for each one of the requests for automotive data made by said data services, which of the data records require user consent; and a users' consent aggregator configured to aggregate consent data for each data records, responsive to an indication that the respective user has been authenticated by the data sources, wherein the requests manager is configured to provide the data services with access to automotive data based on the aggregated users consent data, wherein the records processing module, the requests manager module, and the users' consent aggregator comprise sets of instructions executed over said computer processor, wherein upon at least one of said respective users connecting to at least one of said data services and issuing a request to login with at least one of said data sources:

forwarding said request to the server which forwards said request to the at least one of the data sources, wherein upon authenticating the at least one of said respective users by the at least one of the data sources:

sending, by the at least one of the data sources, to said server, an authorization code/token;

redirecting the at least one of said respective users to the at least one of said data services via an authentication dialog enabled by said code/token; and forwarding by the server, the automotive data from the at least one of the data sources for which consent has been given to the at least one of said data services, wherein said indication that the respective user has been authenticated by the data source is achieved by establishing an authentication session between one of the users and a respective data source.

7. The server according to claim 6, wherein said determining for each request for automotive data made by said data services, which of the data records require consent is carried out using data bundles associating data consumption use cases and respective data records and data sources.

8. The server according to claim 6, wherein said automotive data records are normalized and anonymized.

9. The server according to claim 6, wherein the aggregating consent data indicates for which of the obtained automotive data records, a respective user consent has been given, and for each of the data services.

10. The server according to claim 6, wherein the aggregating consent data comprises a plurality of access tokens provided by the data sources and authorizing access to data for which respective users have been authenticated.

11. A non-transitory computer readable medium for aggregating users' consents for use of automotive data by data services, the computer readable medium comprising a set of instructions that, when executed, cause at least one computer processor to:
obtain, from a plurality of data sources, a plurality of automotive data records associated with connected vehicles having respective users by: collecting raw data from sensors on the connected vehicles of users, normalizing and anonymizing the raw data to create the automotive data records, and storing the automotive data records on a data lake;

issue requests for automotive data, by the data services, wherein it is unknown to the data services, which data source and which users' consent associated therewith are needed in order to address the requests by the at least one of the plurality of data services;

determine for each one of the requests for automotive data made by said data services, which of the data records require user consent;

aggregate user consent data for each data records, responsive to an indication that the respective user have been authenticated by the data sources; and provide the data services with access to automotive data based on the aggregated users consent data, wherein upon at least one of said respective users connecting to at least one of said data services and issuing a request to login with at least one of said data sources:

forward said request to a server which forwards said request to the at least one of the data sources, wherein upon authenticating the at least one of said respective users by the at least one of the data sources:

send, by the at least one of the data sources, to said server, an authorization code/token;

redirect the at least one of said respective users to the at least one of said data services via an authentication dialog enabled by said code/token; and forward by the server, the automotive data from the at least one of the data sources for which consent has been given to the at least one of said data services, wherein said indication that the respective user has been authenticated by the data source is achieved by establishing an authentication session between one of the users and a respective data source.

12. The non-transitory computer readable medium according to claim 11, wherein said determining for each request for automotive data made by said data services, which of the data records require consent is carried out using data bundles associating data consumption use cases and respective data records and data sources.

13. The non-transitory computer readable medium according to claim 11, wherein said automotive data records are normalized and anonymized.

14. The non-transitory computer readable medium according to claim 11, wherein the aggregating consent data indicates for which of the obtained automotive data records, a respective user consent has been given, and for each of the data services.

15. The non-transitory computer readable medium according to claim 11, wherein the aggregating consent data comprises a plurality of access tokens provided by the data sources and authorizing access to data for which respective users have been authenticated.

* * * * *